United States Patent
Peng et al.

(10) Patent No.: US 12,316,658 B2
(45) Date of Patent: May 27, 2025

(54) ARTIFICIAL INTELLIGENCE-BASED NETWORK SECURITY PROTECTION METHOD AND APPARATUS, AND ELECTRONIC DEVICE

(71) Applicant: TENCENT TECHNOLOGY (SHENZHEN) COMPANY LIMITED, Shenzhen (CN)

(72) Inventors: Chenchen Peng, Shenzhen (CN); Guo Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 367 days.

(21) Appl. No.: 17/702,766

(22) Filed: Mar. 23, 2022

(65) Prior Publication Data
US 2022/0224706 A1    Jul. 14, 2022

Related U.S. Application Data

(63) Continuation of application No. PCT/CN2021/077170, filed on Feb. 22, 2021.

(30) Foreign Application Priority Data

Mar. 30, 2020   (CN) .......................... 202010234182.4

(51) Int. Cl.
*H04L 9/00*     (2022.01)
*H04L 9/40*     (2022.01)
(52) U.S. Cl.
CPC ................. *H04L 63/1425* (2013.01)
(58) Field of Classification Search
CPC ..... H04L 63/1425; H04L 45/08; H04L 45/72; H04L 47/2441; H04L 47/2483;
(Continued)

(56) References Cited

U.S. PATENT DOCUMENTS

| 9,331,915 B1* | 5/2016 | Brandwine | ............ H04L 43/028 |
| 10,341,391 B1* | 7/2019 | Pandey | ................... H04L 67/14 |

(Continued)

FOREIGN PATENT DOCUMENTS

| CN | 109818970 A | 5/2019 |
| CN | 110719275 A | 1/2020 |

(Continued)

OTHER PUBLICATIONS

The State Intellectual Property Office of the People's Republic of China (SIPO) Office Action 1 for for 202010234182.4 May 22, 2020 18 Pages (including translation).

(Continued)

*Primary Examiner* — Syed M Ahsan
(74) *Attorney, Agent, or Firm* — ANOVA LAW GROUP PLLC

(57) ABSTRACT

This application provides an artificial intelligence (AI)-based network security protection method and apparatus, an electronic device, and a computer-readable storage medium. The method includes obtaining access traffic that needs to be verified and to be transmitted to a target network address; extracting a data statistical feature of each of a plurality of sessions included in the access traffic that needs to be verified; invoking a neural network model, and based on the data statistical feature of each session, to classify each session as normal or abnormal; identifying a session classified as abnormal in the access traffic that needs to be verified as attack access traffic; and obtaining a source address of the attack access traffic, and screening attack access traffic to be transmitted to the target network address from the source address.

19 Claims, 8 Drawing Sheets

(58) Field of Classification Search
CPC ... H04L 49/208; H04L 63/1416; G06N 3/045; G06N 3/047; G06N 3/08; G06N 20/00
See application file for complete search history.

(56) References Cited

U.S. PATENT DOCUMENTS

| | | | |
|---|---|---|---|
| 2002/0083175 A1* | 6/2002 | Afek | H04L 63/1458 709/239 |
| 2018/0198816 A1 | 7/2018 | Ahmed et al. | |
| 2019/0019058 A1 | 1/2019 | Woodbridge et al. | |
| 2019/0302707 A1* | 10/2019 | Guo | G05B 23/024 |

FOREIGN PATENT DOCUMENTS

| | | |
|---|---|---|
| CN | 110855682 A | 2/2020 |
| CN | 111131335 A | 5/2020 |

OTHER PUBLICATIONS

The World Intellectual Property Organization (WIPO) International Search Report for PCT/CN2021/077170 May 11, 2021 5 Pages (including translation).

* cited by examiner

```
v TLSv1.2 Record Layer: Handshake Protocol: Client Hello
    Content Type: Handshake (22)
    Version: TLS 1.0 (0x0301)  ⇒ 501
    Length: 326   Packet length
  v Handshake Protocol: Client Hello
    Handshake Type: Client Hello (1)
    Length: 322
    Version: TLS 1.2 (0x0303)  ⇒ 502
    > Random: f51e333306cdbea53cafbf4e6eb45a3431f3033be351f3fe
    Session ID Length: 0
    Cipher Suites Length: 148  ⇒ 506
    Cipher Suites (74 suites)  ⇒ 503
    Compression Methods Length: 1
  v Compression Methods (1 method)
        Compression Method: null (0)
    Extensions Length: 133  ⇒ 504
  > Extension: server_name (len=20)  ⇒ 507
  > Extension: ec_point_formats (len=4)
  > Extension: supported_groups (len=52)  ⇒ 505
  > Extension: SessionTicket TLS (len=0)
  > Extension: signature_algorithms (len=32)
  > Extension: heartbeat (len=1)
```

FIG. 5

ARTIFICIAL INTELLIGENCE-BASED NETWORK SECURITY PROTECTION METHOD AND APPARATUS, AND ELECTRONIC DEVICE

RELATED APPLICATIONS

This application is a continuation of PCT Application No. PCT/CN2021/077170, filed on Feb. 22, 2021, which claims priority to Chinese Patent Application No. 202010234182.4, entitled "ARTIFICIAL INTELLIGENCE-BASED NETWORK SECURITY PROTECTION METHOD AND APPARATUS, AND ELECTRONIC DEVICE" filed on Mar. 30, 2020. The two applications are incorporated by reference in their entirety.

FIELD OF THE TECHNOLOGY

This application relates to artificial intelligence (AI) and network technologies, and in particular, to an AI-based network security protection method and apparatus, an electronic device, and a computer-readable storage medium.

BACKGROUND OF THE DISCLOSURE

Artificial intelligence (AI) is a theory, method, technology, and an application system in which a digital computer or a machine controlled by a digital computer is used to simulate, extend, and expand human intelligence, perceive an environment, acquire knowledge, and use the knowledge to obtain an optimal result.

According to the hypertext transfer protocol (HTTP) in the related art, information is transmitted by using a plaintext, which has a risk of being bugged or tampered. According to the hypertext transfer protocol over secure socket layer (HTTPS), developed based on HTTP, encrypted information is exchanged by using a secure socket layer (SSL), which provides an authentication function and an information confidentiality and integrity verification function. With the enhancement of users' security requirements and some mandatory policy requirements, more and more network service providers actively or passively switch their services from HTTP to HTTPS, to bring higher security to data transmission, which also gives hackers an opportunity. In the HTTPS protocol, encrypted packets are transmitted in a network, which makes a content detection technology in the related art ineffective. Due to high resource consumption in processing HTTPS connections, an attack has relatively low costs, but causes great damage.

SUMMARY

Embodiments of this application provide an AI-based network security protection method and apparatus, an electronic device, and a computer-readable storage medium, which can identify and clean encrypted attack traffic and unencrypted attack traffic.

The technical solutions in the embodiments of this application are implemented as follows:

One aspect of this application provides an AI-based network security protection method, performed by an electronic device. The method includes obtaining access traffic that needs to be verified and to be transmitted to a target network address; extracting a data statistical feature of each of a plurality of sessions included in the access traffic that needs to be verified; invoking a neural network model, and based on the data statistical feature of each session, to classify each session as normal or abnormal; identifying a session classified as abnormal in the access traffic that needs to be verified as attack access traffic; and obtaining a source address of the attack access traffic, and screening attack access traffic to be transmitted to the target network address from the source address.

Another aspect of this application provides an AI-based network security protection apparatus, including a traffic obtaining module, configured to obtain access traffic that needs to be verified to be transmitted to a target network address; a data extraction module, configured to extract a data statistical feature of each of a plurality of sessions comprised in the access traffic that needs to be verified; a traffic classification module, configured to invoke a neural network model based on the data statistical feature of each session, to classify each session as normal or abnormal; a traffic identification module, configured to identify a session classified as abnormal in the access traffic that needs to be verified as attack access traffic; and a traffic cleaning module, configured to obtain a source address of the attack access traffic, and screen attack access traffic to be transmitted to the target network address from the source address.

The embodiments of this application provide an electronic device, including: a memory and a processor coupled to the memory. The processor is configured to perform: obtaining access traffic that needs to be verified and to be transmitted to a target network address; extracting a data statistical feature of each of a plurality of sessions included in the access traffic that needs to be verified; invoking a neural network model, and based on the data statistical feature of each session, to classify each session as normal or abnormal; identifying a session classified as abnormal in the access traffic that needs to be verified as attack access traffic; and obtaining a source address of the attack access traffic, and screening attack access traffic to be transmitted to the target network address from the source address.

The embodiments of this application provide a non-transitory computer-readable storage medium, storing executable instructions, when executed by a processor, causing the processor to implement the AI-based network security protection method provided in the embodiments of this application.

In embodiments consistent with the present disclosure, sessions in access traffic that needs to be verified are analyzed to obtain features at a data statistical level, and attack access traffic is identified without relying on features at an information level. Therefore, the identification is not affected regardless of whether a traffic packet is encrypted, so that encrypted and unencrypted attack access traffic can be identified, and screening processing can be performed based on a source address of the attack access traffic to clean various access traffic (including the encrypted and unencrypted attack access traffic), thereby improving effectiveness of data protection.

BRIEF DESCRIPTION OF THE DRAWINGS

FIG. 5 is a schematic diagram of packet capture in an AI-based network security protection method according to an embodiment of this application.

DESCRIPTION OF EMBODIMENTS

Figure 1:
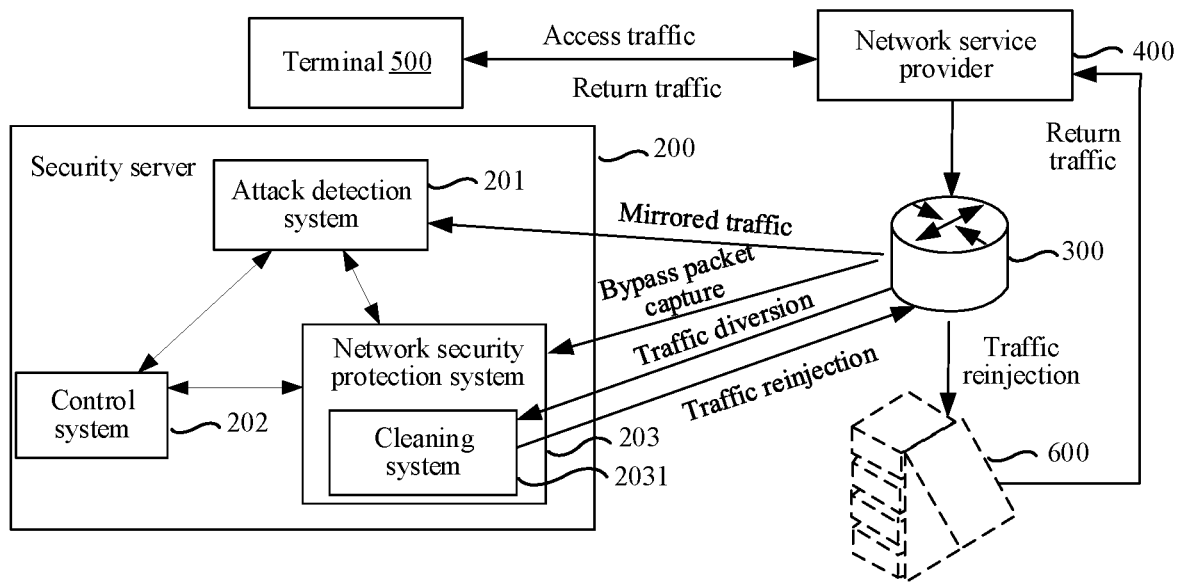
FIG. 1 is a schematic architectural diagram of an application system of an AI-based network security protection method according to an embodiment of this application.

To make the objectives, technical solutions, and advantages of this application clearer, the following describes this application in further detail with reference to the accompanying drawings. The described embodiments are not to be considered as a limitation to this application. All other embodiments obtained by a person of ordinary skill in the art without creative efforts shall fall within the protection scope of this application.

In the following descriptions, related "some embodiments" describe a subset of all possible embodiments. However, it may be understood that the "some embodiments" may be the same subset or different subsets of all the possible embodiments, and may be combined with each other without conflict.

Unless otherwise defined, meanings of all technical and scientific terms used in this specification are the same as those usually understood by a person skilled in the art to which this application belongs. Terms used in this specification are merely intended to describe objectives of the embodiments of this application, but are not intended to limit this application.

Before the embodiments of this application are further described in detail, nouns and terms involved in the embodiments of this application are described. The nouns and terms provided in the embodiments of this application are applicable to the following explanations.

(1) Challenge collapsar (CC) attack: A principle of the CC attack is that an attacker controls some hosts to constantly send a large quantity of data packets to a targeted server, causing server resources to be exhausted, until a crash occurs. CC is mainly used for attacking a page. When a particularly large quantity of people visit a web page, a speed of opening the web page decreases. CC is to simulate a plurality of users constantly accessing those pages that require a large quantity of data operations, causing a waste of server resources. A central processing unit is in a 100% occupied state for a long time, there are always unfinished connections until network congestion is caused, and normal access is suspended.

(2) Distributed denial of service (DDoS) attack: It is a distributed DoS attack. A hacker controls zombies distributed across the Internet to send a large amount of abnormal traffic to a target server at the same time, so that the server is busy in processing the abnormal traffic, and cannot process normal user requests, or even a system crashes, resulting in denial of service. With the development of technologies, some attack methods such as an HTTPS CC attack that are much more advanced than ever appear in a continuous confrontation process.

(3) HTTPS: It is an HTTP channel aimed at security. Simply, it is a secure version of HTTP, that is, an SSL is added to HTTP.

(4) Screen: It means intercepting, partially discarding, delaying forwarding, or redirecting access traffic from a specific source address, to make it impossible or difficult for the access traffic from the specific source address to access a protected target network address, thus giving up attacking.

(5) Network service provider: In a network architecture, access of a client to a target address is routed through an egress of a network service provider such as China Unicom and China Telecom. The network service provider is an entity that provides a network access function to subscribers.

(6) Traffic cleaning: It means distinguishing normal traffic from malicious traffic, intercepting the malicious traffic, and reinjecting the normal traffic to a target network address, to ensure that the target network address can be accessed normally.

According to the HTTP protocol in the related art, information is transmitted by using a plaintext, which has a risk of eavesdropping and tampering. According to HTTPS, developed based on HTTP, encrypted information is exchanged by using an SSL/transport layer security (TLS) protocol, which provides an authentication function and an information confidentiality and integrity verification function. With the enhancement of users' security requirements and some mandatory policy requirements, more and more network service providers actively or passively switch their services from HTTP to HTTPS. HTTPS brings higher security to data transmission, which also gives hackers an opportunity. In the HTTPS protocol, encrypted packets are transmitted in a network, which makes a content detection technology in the related art ineffective. Due to huge resource consumption in processing HTTPS connections, an HTTPS DDoS attack has relatively low costs, but causes great damage. To this end, it is necessary to provide a network security protection solution in a non-decryption scenario.

AI technologies based on big data analysis, machine learning, and deep learning have abundant practice in the field of network security, and have been widely applied to actual security scenarios, including spam identification, harassment SMS identification, webshell detection, smart scanners, domain name detection based on a domain name generation algorithm, anti-credit card fraud, and the like. In an AI-based network security protection method provided in the embodiments of this application, a neural network model is used to learn distribution and values of a cipher suite, group content, a packet length, a cipher suite length, a group length, an extension length, and an extension quantity, to identify HTTPS attack traffic without decryption, which shows a good protection effect in a plurality of attacks.

According to HTTPS CC attack defense solutions in the related art, one aspect is to decrypt encrypted traffic, and then extract an attack feature from decrypted plaintext information, to identify attack traffic. Another aspect is to analyze an attack behavior pattern. For example, a scanning attack usually traverses a resource directory constantly. Therefore, it is very likely to access different uniform resource locators. In addition, obtained response codes are uncertain, and there may be a large quantity of non-200 normal response codes. For request methods, different attempts may be made constantly, such as a request to obtain data from a server, a request to transmit data to the server, and an OPTION request. Parameters requesting the same uniform resource locator may be replaced differently. In a concentrated time period, there may be a large quantity of Internet Protocol (IP) addresses accessing the same fixed uniform resource locator, and valid user agents are constantly forged to avoid feature-based scanning and removing by a user agent rule.

The HTTPS CC defense algorithm in the related art mainly relies on traffic decryption, and has obvious shortcomings: 1. It is expensive. Huge system resources are consumed to decrypt massive encrypted traffic one by one. System consumption of defending against HTTPS CC is about 10 times that of defending against HTTP CC. 2. Scenarios are limited. In many scenarios, users do not import certificates into a third-party protection device, especially in public cloud scenarios. As a result, a protection system does not have a decryption capability and cannot defend against HTTPS CC attacks. 3. It has a risk of mistaken processing. In an identification solution based on behavior patterns, normal user behavior in some service scenarios is highly similar to attacker behavior, which is prone to misjudgment. In addition, user behavior is diversified and changeable. The identification solution based on behavior patterns bring challenges to building a user behavior model.

HTTPS CC attack traffic is encrypted and transmitted, which is a bottleneck to content-based attack detection and defense solutions in the related art. Although protection can still be performed through decryption, due to huge resource consumption in processing HTTPS connections, an HTTPS DDoS attack has relatively low costs, but causes great damage. Based on the foregoing problem, the embodiments of this application provide an AI-based network security protection method, which is actually a non-decryption HTTPS CC attack identification solution based on a convolutional neural network. In the solution, a neural network model may be trained by using massive bypass data, after the model is trained and mature, the model has a capability of automatically determining normal traffic and attack traffic, and finally, in a protection process, a protection system keeps communicating with the neural network model: The protection system receives data, and transmits the data to the neural network model. The neural network model determines validity of the data, and transmits a result to the protection system. The protection system performs integration and statistical collection processing (that is, data pre-processing of the convolutional neural network) on captured packet files, and the protection system may screen and blacklist a malicious address (for example, an IP address) according to a determining result of the neural network model, to implement effective protection against HTTPS CC attacks. In the AI-based network security protection method provided in the embodiments of this application, effective and automatic protection against HTTPS CC attacks can be implemented without requiring users to take extra trouble to import certificates, and normal services are not affected, which is especially suitable for a platform such as an enterprise cloud with various service types, serious attack threats, and high service importance. In the AI-based network security protection method provided in the embodiments of this application, after a plurality of iterations and optimizations, the neural network model has formed a mature non-decryption HTTPS CC attack identification and defense solution, and shows a good cleaning rate in a plurality of attack-defense confrontations in a network.

The embodiments of this application provide an AI-based network security protection method and apparatus, an electronic device, and a computer-readable storage medium, which can resolve a technical problem of identifying encrypted attack access traffic and unencrypted attack access traffic. The following describes an exemplary application of the electronic device provided in the embodiments of this application. The electronic device provided in the embodiments of this application may be implemented as various types of user terminals such as a notebook computer, a tablet computer, a desktop computer, a set-top box, a mobile device (for example, a mobile phone, a portable music player, a personal digital assistant, a special messaging device, and a portable game device), or may be implemented as a server. The following describes an exemplary application when the device is implemented as a server.

FIG. 1 is a schematic architectural diagram of an application system of an AI-based network security protection method according to an embodiment of this application. For example, in a web page access scenario, a terminal 500 receives a click/tap operation performed by a user on a web page link, and extracts, from the web page link, a target network address (a network address of a service server 600) corresponding to the web page link. The terminal 500 generates a web page access request corresponding to the target network address, and adds, to access traffic, the web page access request to be transmitted to the service server 600, to transmit the web page access request to a network service provider 400. The network service provider 400 transmits the access traffic to a core router 300, and the core router 300 forwards the access traffic to the network address (that is, the target network address) of the service server 600. To prevent attack traffic in the access traffic from attacking the service server, a security server is required to identify and clean the access traffic. A session classified as abnormal in access traffic that needs to be verified is identified as attack access traffic, to obtain a source address of the attack access traffic as a malicious address, traffic from the malicious address is screened, and normal traffic that is not from the malicious address is reinjected into the core router. The core router 300 forwards the normal traffic to the target network address (the network address of the service server 600). The service server 600 adds an access result to return traffic, and returns the return traffic to the terminal 500 by using the network service provider 400, to present the web page access result on the terminal 500.

In some embodiments, the network service provider 400 transmits the access traffic to the core router 300, and the core router forwards the access traffic to the network address (that is, the target network address) of the service server 600. To prevent attack traffic in the access traffic from attacking the service server 600, a security server 200 is required to identify and clean the access traffic. Specifically, an attack detection system 201 deployed in the security server 200 obtains, from the core router 300 as access traffic that needs to be tested, mirrored traffic obtained by replicating the access traffic to be transmitted to the target network address. When attack behavior is detected, the attack detection system 201 transmits an alarm notification to a control system 202, and the control system 202 forwards the alarm notification to a network security protection system 203. The network security protection system 203 obtains the mirrored traffic of the access traffic from the core router 300 as access traffic that needs to be verified, and the network security protection system 203 performs data extraction on the access traffic that needs to be verified, and communicates with a neural network model by using a network security protection process in the network security protection system 203. The neural network model extracts a hidden layer feature from a data statistical feature of each session, to classify each session as normal or abnormal based on the hidden layer feature, and identify a session classified as abnormal in the access traffic that needs to be verified as attack access traffic, to obtain a source address of the attack access traffic as a malicious address. A cleaning system 2031 in the network security protection system 203 diverts the access traffic from the core router 300, then screens attack traffic from the malicious address, and reinjects, to the core router 300, normal traffic that is not from the malicious address. The core router 300 forwards the normal traffic to the target network address.

In some embodiments, the security server 200 may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform.

Figure 2:
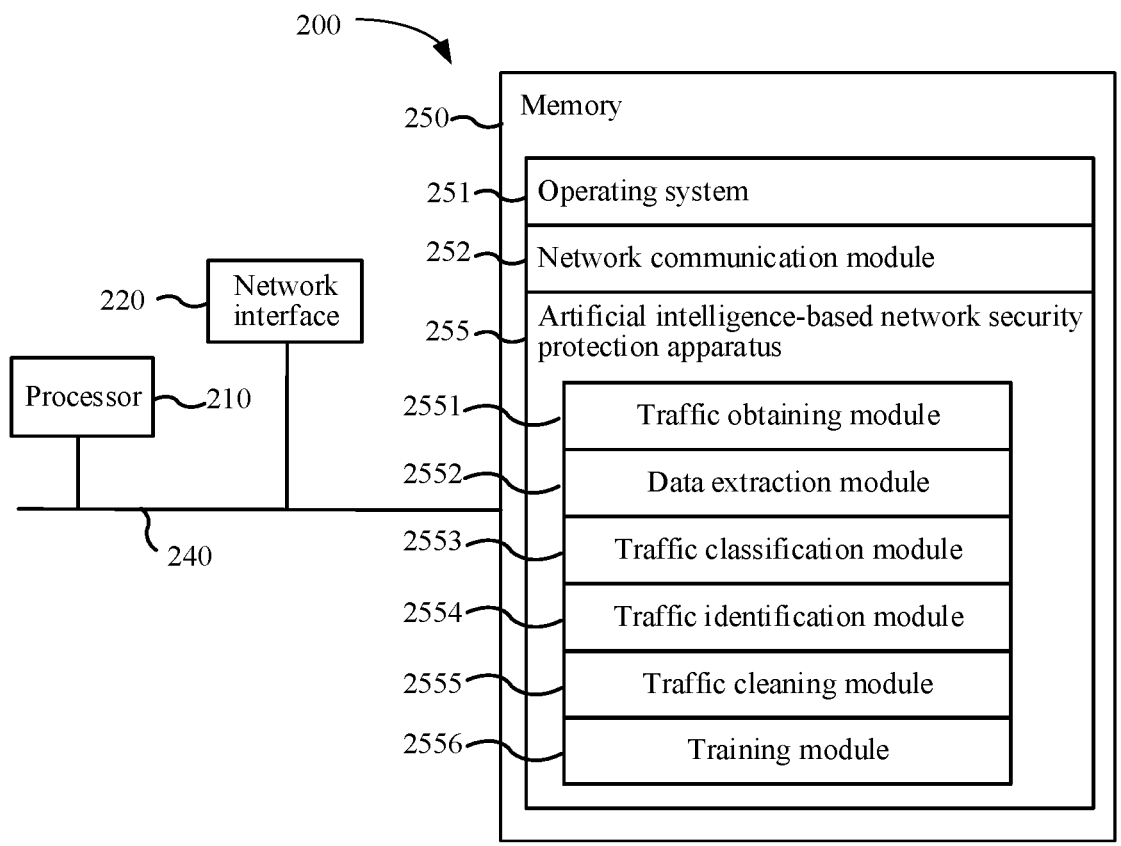
FIG. 2 is a schematic structural diagram of a security server 200 applying an AI-based network security protection method according to an embodiment of this application.

FIG. 2 is a schematic structural diagram of a security server 200 applying an AI-based network security protection method according to an embodiment of this application. The security server 200 shown in FIG. 2 includes: at least one processor 210, a memory 250, and at least one network interface 220. Various assemblies in the security server 200 are coupled together via a bus system 240. It may be understood that the bus system 240 is configured to implement connection and communication between the components. In addition to a data bus, the bus system 240 further includes a power bus, a control bus, and a state signal bus. However, for ease of clear description, all types of buses are marked as the bus system 240 in FIG. 2.

The processor 210 may be an integrated circuit chip having a signal processing capability, for example, a general purpose processor, a digital signal processor (DSP), or another programmable logic device (PLD), discrete gate, transistor logical device, or discrete hardware component. The general purpose processor may be a microprocessor, any conventional processor, or the like.

The memory 250 may be a removable memory, a non-removable memory, or a combination thereof. Exemplary hardware devices include a solid-state memory, a hard disk drive, an optical disc driver, or the like. In some embodiments, the memory 250 includes one or more storage devices that are physically remote from the processor 210.

The memory 250 includes a volatile memory or a non-volatile memory, or may include both a volatile memory and a non-volatile memory. The non-volatile memory may be a read-only memory (ROM), and the volatile memory may be a random access memory (RAM). The memory 250 described in the embodiments of this application is to include any other suitable type of memories.

In some embodiments, the memory 250 may store data to support various operations. Examples of the data include programs, modules, and data structures, or a subset or a superset thereof. The descriptions are made below by using examples.

An operating system 251 includes a system program configured to process various basic system services and perform a hardware-related task, for example, a framework layer, a core library layer, and a driver layer, and is configured to implement various basic services and process a hardware-related task.

A network communication module 252 is configured to reach another computing device through one or more (wired or wireless) network interfaces 220. Exemplary network interfaces 220 include: Bluetooth, wireless compatible authentication (Wi-Fi), a universal serial bus (USB), and the like.

In some embodiments, the apparatus provided in the embodiments of this application may be implemented by software. FIG. 2 shows an AI-based network security protection apparatus 255 stored in the memory 250, which may be software in a form such as a program or a plug-in, and includes the following software modules: a traffic obtaining module 2551, a data extraction module 2552, a traffic classification module 2553, a traffic identification module 2554, a traffic cleaning module 2555, and a training module 2556. These modules are logical, and therefore may be combined in any manner or further split according to a function to be implemented. Functions of the modules are described below.

The AI-based network security protection method provided in the embodiments of this application is described with reference to the exemplary application and implementation of the server provided in the embodiments of this application.

Figure 3A:
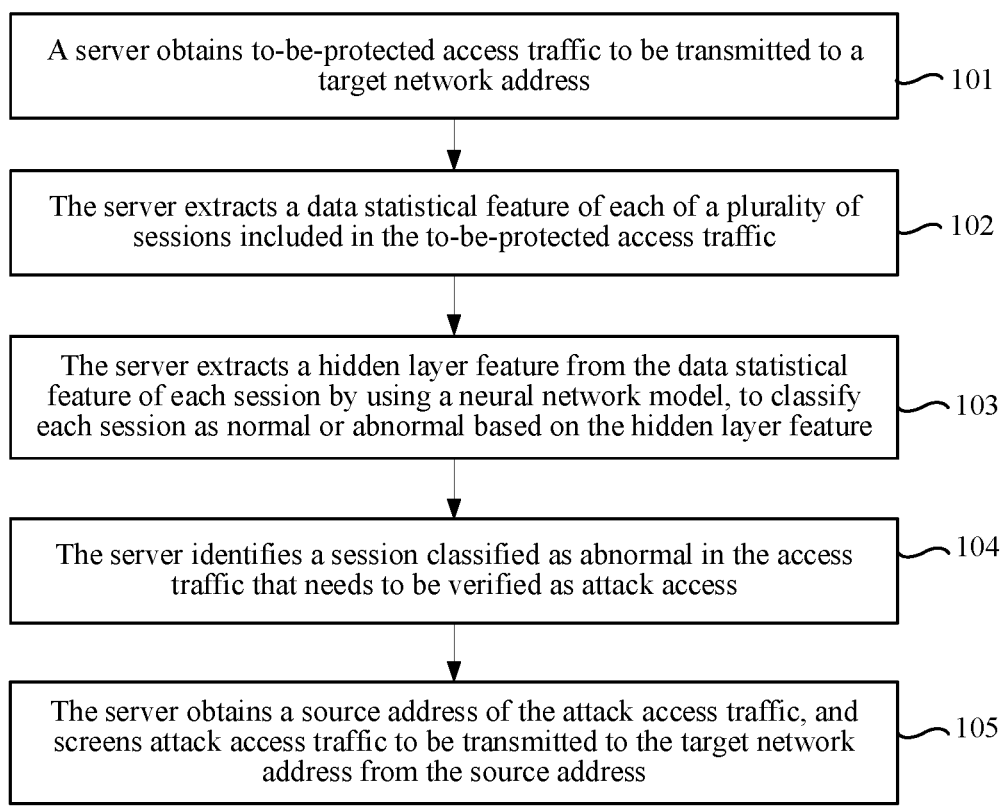
FIG. 3A to FIG. 3C are schematic flowcharts of an AI-based network security protection method according to an embodiment of this application.

FIG. 3A is a schematic flowchart of an AI-based network security protection method according to an embodiment of this application, which is described with reference to steps shown in FIG. 3A.

Step 101: A server obtains access traffic that needs to be verified to be transmitted to a target network address.

For example, a network security protection system is deployed in the server. A network security protection process in the network security protection system obtains the access traffic that needs to be verified to be transmitted to the target network address, the target network address being a protected network address. An attack detection system is also deployed in the server. The attack detection system actually performs rough attack detection on access traffic that needs to be tested to be transmitted to the target network address.

In some embodiments, before step 101 is performed, the attack detection system obtains, from a router, the access traffic that needs to be tested, to be transmitted to the target network address, the access traffic that needs to be tested being mirrored traffic obtained by replicating access traffic to be transmitted to the target network address; and performs attack behavior pattern matching on the access traffic that needs to be tested, and determines, in response to matched attack behavior, that the access traffic that needs to be verified to be transmitted to the target network address needs to be obtained, to identify attack access traffic in the access traffic that needs to be verified based on a neural network model. The mirrored traffic is detected, so that a forward routing process of the access traffic is not affected, which prevents a communication delay and effectively increases a communication speed.

In some embodiments, the network security protection system classifies the access traffic that needs to be verified based on the neural network model. For example, the network security protection system classifies sessions in the access traffic that needs to be verified, and identifies attack traffic formed by an abnormal session. The access traffic that needs to be tested is an object on which the attack detection system performs attack detection based on an attack behavior pattern. The attack detection system identifies whether attack behavior exists in the access traffic that needs to be tested, which is merely qualitative analysis of the access traffic that needs to be tested, and is an identification process less refined than identification based on the neural network model. The attack detection may be performed based on a behavior pattern. A core router forwards, to the attack detection system through optical splitting, the mirrored traffic obtained by replicating the access traffic to be transmitted to the target network address, to perform attack detection. When attack behavior is detected through matching, the attack detection system generates an alarm and transmits the alarm to a control system. The protection system receives the alarm from the control system, and determines that the access traffic that needs to be verified to be transmitted to the target network address needs to be obtained, to identify attack access traffic in the access traffic that needs to be verified based on the neural network model.

In some embodiments, the access traffic that needs to be verified and the access traffic that needs to be tested may be access traffic occurring in the same time period or access traffic occurring in different time periods (that is, staggered time), which specifically depends on a data cache policy of the router, that is, a cache time of access traffic received by the router. Specifically, when the cache time of the access traffic received by the router exceeds a time consumed by attack detection, the access traffic that needs to be verified and the access traffic that needs to be tested may be access traffic occurring in the same time period, to ensure that all traffic is subjected to attack detection and identified by using the neural network model, and ensure that no attack traffic is omitted and reaches the target network address. When the cache time of the access traffic received by the router does not exceed the time consumed by attack detection, the access traffic that needs to be verified is access traffic occurring in a time period after the access traffic that needs to be tested, to ensure that normal traffic can reach the target network address in a relatively short time, which is correspondingly forwarded without waiting for completion of the attack detection.

In some embodiments, the obtaining access traffic that needs to be verified to be transmitted to a target network address in step 101 may be implemented by using the following technical solution: transmitting a mirrored traffic request to the router, the mirrored traffic request carrying the target network address, so that the router performs the following operation: during routing of access traffic to be transmitted to the target network address, replicating the access traffic to obtain mirrored traffic of the access traffic, the access traffic including a network request transmitted by a subscriber of a network service provider to the target network address; and receiving the mirrored traffic transmitted by the router as the access traffic that needs to be verified.

In some embodiments, the network service provider is an entity that provides a network access function to subscribers. In the following cases, the network security protection system may transmit a mirrored traffic request to the router, to obtain mirrored traffic as access traffic that needs to be verified: the network security protection system does not have source address data of attack access traffic as a security protection function for the target network address is just enabled; a source address of attack access traffic expires, that is, does not have time validity, which is not worthy of protection; a ratio of a quantity of source addresses of attack access traffic to a quantity of attacks to the target network address is less than a ratio threshold, which represents that there are still potentially attacking source addresses that have not been discovered; and a quantity of source addresses of attack access traffic is less than a quantity threshold, which may be an average value of address quantities of attack access traffic to protected addresses in an entire network, indicating that a quantity of source addresses that have been detected does not reach an average level of the entire network. Using the mirrored traffic as the access traffic that needs to be verified is a bypass monitoring mode. A bypass deployment solution is a monitoring mode that has minimum impact on the current network, which neither affects an existing network structure, nor affects a network speed. In the bypass mode, data copied from a mirrored port is analyzed, which does not delay an original data packet.

In some embodiments, the obtaining access traffic that needs to be verified to be transmitted to a target network address in step 101 may be implemented by using the following technical solution: transmitting a route diversion rule to the router, the route diversion rule carrying the target network address and a diverted target network address, so that the router performs the following operation: guiding access traffic to be transmitted to the target network address to the diverted target network address, the access traffic including a network request transmitted by a subscriber of a network service provider to the target network address; and receiving the access traffic guided by the router to the diverted target network address as the access traffic that needs to be verified. The access traffic is used as the access traffic that needs to be verified, which can ensure comprehensive detection, and prevent access traffic from a malicious address from being routed to a service server, thereby improving protection quality of network security protection.

In some embodiments, the target network address is a network address of the service server, the network service provider is an entity that provides a network access function to subscribers, and route diversion is a technical means for traffic diversion, and is essentially publishing a new routing rule to the router, that is, forwarding a packet whose destination address is the target network address to the network security protection system, and a network address of the network security protection system is the diverted target network address. The new routing rule herein is forwarding the packet from the router to the network security protection system, to replace an original routing rule of the packet in the router, and the original routing rule herein is used for normally forwarding the packet whose destination address is the target network address to a next-hop router. In the following cases, the network security protection system may transmit an access traffic diversion request: the network security protection system does not have source address data of attack access traffic as a security protection function for the target network address is just enabled; a source address of attack access traffic expires, that is, does not have time validity, which is not worthy of protection; a ratio of a quantity of source addresses of attack access traffic to a quantity of attacks to the target network address is less than a ratio threshold, which represents that there are still potentially attacking source addresses that have not been discovered; and a quantity of source addresses of attack access traffic is less than a quantity threshold, which may be an average value of address quantities of attack access traffic to protected addresses in an entire network, indicating that a quantity of source addresses that have been detected does not reach an average level of the entire network. The traffic obtained by using the diversion rule is used as the access traffic that needs to be verified, which can ensure that each data packet is not omitted, that is, each data packet is obtained from the core router, attack traffic identification is performed on each data packet, and then attack traffic is correspondingly screened and normal traffic is correspondingly forwarded.

Step 102: The server extracts a data statistical feature of each of a plurality of sessions included in the access traffic that needs to be verified.

The network security protection system is deployed in the server, and the network security protection process in the network security protection system may extract the data statistical feature of each of the plurality of sessions included in the access traffic that needs to be verified. In the session, a data packet of a client is transmitted in the network in a packet form. The data statistical feature is obtained by using the network security protection process in the network security protection system by performing statistical analysis at a data level on the packet received by the router, and inputted to the neural network model for classification.

Figure 3B:
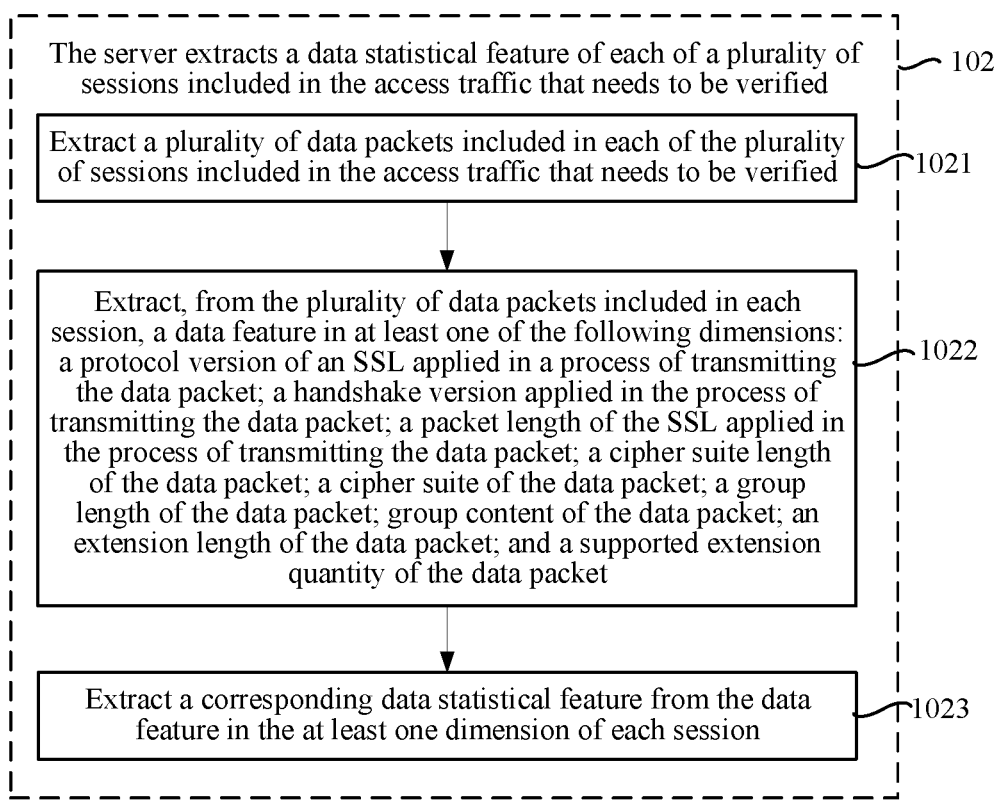

FIG. 3B is a schematic flowchart of an AI-based network security protection method according to an embodiment of this application, which is described with reference to steps 1021 to 1023 shown in FIG. 3B. The extracting a data statistical feature of each of a plurality of sessions included in the access traffic that needs to be verified in step 102 may be implemented by performing the following steps 1021 to 1023.

Step 1021: Extract a plurality of data packets included in each of the plurality of sessions included in the access traffic that needs to be verified.

For example, each session includes a plurality of data packets. The session is a set of data packets with the same source IP, destination IP, source port, destination port, and protocol.

Step 1022: Extract, from the plurality of data packets included in each session, a data feature in at least one of the following dimensions: a protocol version of an SSL applied in a process of transmitting the data packet; a handshake version applied in the process of transmitting the data packet; a packet length of the SSL applied in the process of transmitting the data packet; a cipher suite length of the data packet; a cipher suite of the data packet; a group length of the data packet; group content of the data packet; an extension length of the data packet; and a supported extension quantity of the data packet.

Step 1023: Extract a corresponding data statistical feature from the data feature in the at least one dimension of each session.

In some embodiments, the extracting a corresponding data statistical feature from the data feature in the at least one dimension of each session in step 1023 may be implemented by using the following technical solution: obtaining a normal mode of a data feature in each dimension in normal session samples and an abnormal mode of the data feature in each dimension in abnormal session samples; determining a distance between the data feature in the at least one dimension of each session and a normal mode in the corresponding dimension as a normal absolute distance in the corresponding dimension; determining a distance between the data feature in the at least one dimension of each session and an abnormal mode in the corresponding dimension as an abnormal absolute distance in the corresponding dimension; and combining the normal absolute distance and the abnormal absolute distance in the at least one dimension that are determined for each session as the data statistical feature of the corresponding session. The data feature in each dimension of the session is used as the data statistical feature of the corresponding session, so that a session type can be identified without decryption.

In some embodiments, the following basic data features of each packet are extracted from captured packet files: an SSL protocol version, a handshake version, an SSL packet length, a cipher suite length, a cipher suite, a group length, group content, an extension length, and a supported extension quantity. The basic data features of each packet are analyzed to extract modes of aggregates of each basic data feature in attack packets and normal packets. The data may be used as input data of a convolutional neural network. An SSL protocol version, a handshake version, an SSL packet length, a cipher suite length, a cipher suite, a group length, group content, an extension length, and a supported extension quantity of a data packet are basic features of a protocol, and may be directly extracted from captured packet files of protocol traffic, to further perform statistical analysis on the basic data features to obtain secondary features, analyze aggregate values, that is, modes, of each basic data feature in normal and abnormal session samples, and respectively calculate absolute distances between the basic feature in the captured packet files and the modes. The sessions in the access traffic that needs to be verified are analyzed to obtain features at a data statistical level, and attack access traffic is identified without relying on features at an information level. Therefore, the identification is not affected regardless of whether a traffic packet is encrypted, so that encrypted and unencrypted attack access traffic can be identified, and screening processing can be performed based on a source address of the attack access traffic to clean various access traffic (including the encrypted and unencrypted attack access traffic). The features at the data statistical level herein are the foregoing data statistical features in a plurality of dimensions, so that more accurate attack traffic identification can be performed based on the data statistical features in the plurality of dimensions.

In some embodiments, before step 103, session samples are obtained by packet capture from a router bypass, and a pre-labeled normal session sample and abnormal session sample are combined into a training sample set; the neural network model is initialized, and a loss function including a session sample and a classification result corresponding to the session sample is initialized; and the following processing is performed in each iterative training process of the neural network model: classifying, by using the neural network model, session samples included in the training sample set, to obtain classification results corresponding to the session samples; substituting true categories corresponding to the session samples and the classification results into the loss function, to determine a neural network model parameter corresponding to a minimum value of the loss function; and updating the neural network model according to the determined neural network model parameter.

In some embodiments, the neural network model includes an embedding layer, a hidden layer, and a fully connected layer. As the first layer of the neural network model, the embedding layer is configured to fix an input dimension. A convolutional layer is configured to extract features. A pooling layer in the hidden layer is configured to sample features. The fully connected layer is configured to map a learned distributed feature representation to a sample label space as a classifier. The hidden layer also includes a batch normalization layer, a random deactivation layer, the convolutional layer, the pooling layer, an unfolding layer, and a Gaussian noise layer. The batch normalization layer re-normalizes an activation value of a previous layer for each batch of training sample sets, so that its output data has an average value close to 0 and a standard deviation close to 1, that is, normal distribution is formed. The random deactivation layer is configured to disconnect an entire one-dimensional (1D) feature map instead of a single neuron. If there is a strong correlation between adjacent elements of a feature map (which usually occurs in a low-level convolutional layer), a common dropout operation cannot regularize its output, otherwise, a significant drop is caused to a learning rate. In this case, a spatial dropout 1D operation in the random deactivation layer can help improve independence between feature maps. The Gaussian noise layer in the hidden layer applies, to data, additive Gaussian noise with an average value being 0 and a standard deviation being a sample standard deviation. This layer is relatively useful in overcoming over-fitting. Gaussian noise is a natural choice when input data needs to be destroyed. Flattening processing in the hidden layer is to flatten an input, that is, to make a multi-dimensional input be 1D, which is often used in transition from the convolutional layer to the fully connected layer. After the convolutional neural network model is built, the model is trained by using massive normal service data and attack data. After the model converges, the model has a capability of automatically identifying normal service data and attack data. For a loss function used in an iterative training process, refer to formula (1):

$$H(y,t)=H_t(y)=-\Sigma_i t_i \log y_i \quad (1)$$

$t_i$ is a true label and represents a true category, $y_i$ is obtained by the neural network model through classification, and $H(y, t)$ is the loss function.

In some embodiments, before step 103, the data statistical feature of each session is transmitted to the neural network model by using a socket connection between the network security protection process and the neural network model, so that the neural network model performs classification. The neural network model may be a process running the neural network model. Before a session classified as abnormal in the access traffic that needs to be verified is identified as attack access traffic, the following technical solution may be further performed: receiving, by using the socket connection between the network security protection process and the neural network model, a classification result returned by the neural network model.

Step 103: The server invokes the neural network model based on the data statistical feature of each session, to classify each session as normal or abnormal.

In some embodiments, herein, the network security protection system is deployed in the server, the network security protection process communicates with the neural network model (that is, the process running the neural network model), and the neural network model includes an embedding layer, a hidden layer, and a fully connected layer that are cascaded. In step 103, the neural network model is invoked based on the data statistical feature of each session, to classify each session as normal or abnormal. For example, the following technical solution may be performed for each session to classify each session: receiving the data statistical feature of the session by using the embedding layer of the neural network model, and transmitting the data statistical feature of the session to the hidden layer; extracting a hidden layer feature from the received data statistical feature by using the hidden layer of the neural network model, and transmitting the hidden layer feature to the fully connected layer; and mapping the received hidden layer feature to a normal category probability and an abnormal category probability by using the fully connected layer of the neural network model, a category corresponding to a larger value of the normal category probability and the abnormal category probability being a classification result of the session.

For example, the fully connected layer functions as a "classifier" in the entire neural network model. If operations of the convolutional layer, the pooling layer, and the like are performed to map original data to a hidden layer feature space, the fully connected layer functions to map a learned "distributed feature representation" to a sample label space. In actual use, the fully connected layer may be implemented by a convolution operation: A fully connected layer whose previous layer is fully connected may be converted into a convolution with a 1×1 convolution kernel. A fully connected layer whose previous layer is a convolutional layer may be converted into a global convolution with a convolution kernel of (height×width). The height and the width are respectively a height and a width of a convolution result of the previous layer. A core operation of the fully connected layer is matrix vector multiplication, whose essence is linear transformation from one feature space to another feature space. The fully connected layer often appears in the last few layers, and is configured to perform weighted summation processing on previous involved features.

In some embodiments, the hidden layer includes: a batch normalization layer, a convolutional layer, and a pooling layer; and the extracting a hidden layer feature from the received data statistical feature by using the hidden layer includes: normalizing an activation value of the received data statistical feature by using the batch normalization layer, to obtain a data statistical feature satisfying normal distribution; performing, by using the convolutional layer, feature extraction processing on the data statistical feature outputted by the batch normalization layer, to obtain a convolutional layer feature corresponding to the data statistical feature; and sampling, by using the pooling layer, the convolutional layer feature outputted by the convolutional layer, to obtain the hidden layer feature corresponding to the data statistical feature.

For example, the batch normalization layer re-normalizes an activation value of a previous layer for each batch of training sample sets, so that its output data has an average value close to 0 and a standard deviation close to 1, that is, normal distribution is formed. There are three rounds of iterations of the convolutional layer and the pooling layer in the neural network model. The convolutional layer is configured to perform feature extraction to obtain a feature map. The pooling layer compresses an input feature map, to reduce the feature map and simplify network computational complexity, and perform feature compression to extract main features.

Step 104: The server identifies a session classified as abnormal in the access traffic that needs to be verified as attack access traffic.

In some embodiments, the network security protection system is deployed in the server, and the network security protection process in the network security protection system receives a classification result of the neural network model. During classification, the neural network model outputs probabilities of each session in the access traffic that needs to be verified being an abnormal session and a normal session. When the probability of being an abnormal session exceeds the probability of being a normal session, the session is classified as an abnormal session, and is identified as attack access traffic.

Step 105: The server obtains a source address of the attack access traffic, and screens attack access traffic to be transmitted to the target network address from the source address.

In some embodiments, when the access traffic that needs to be verified is obtained from the router through guiding by using the route diversion rule, the obtaining a source address of the attack access traffic, and screening attack access traffic to be transmitted to the target network address from the source address in step 105 may be implemented by using the following technical solution: filtering out the attack access traffic in the access traffic that needs to be verified, and transmitting filtered normal access traffic to the router for forwarding by the router; and transmitting the source address to the router, so that the router identifies new access traffic from the source address as new attack access traffic, and screens the new attack access traffic, the new access traffic being transmitted by the network service provider to the target network address after the access traffic that needs to be verified, and the new access traffic including a network request transmitted by the subscriber of the network service provider to the target network address.

For example, the traffic obtained by using the diversion rule is used as the access traffic that needs to be verified, which can ensure that each data packet is not omitted, that is, each data packet is obtained from the core router, attack traffic identification is performed on each data packet, and then attack traffic is correspondingly screened and normal traffic is correspondingly forwarded. The solution of using the traffic obtained by using the diversion rule as the access traffic that needs to be verified has a network transmission speed slightly lower than the solution of identification based on the mirrored traffic, but can ensure that no data packet of attack traffic is omitted.

In some embodiments, when the access traffic that needs to be verified is obtained from the router through guiding by using the route diversion rule, the access traffic that needs to be verified herein is original traffic without mirroring. Herein, the attack access traffic in the access traffic that needs to be verified is filtered out, and filtered normal access traffic is transmitted to the router, so that the router forwards the filtered normal access traffic to a next-hop router that reaches the target network address. The foregoing process is a process of reinjecting normal traffic. In addition, the obtained source address is also transmitted to the router, so that the router identifies new access traffic from the source address as new attack access traffic, and screens the new attack access traffic. Herein, alternatively, the source address may be not transmitted to the router, but instead, the new access traffic is also diverted from the router to the network security protection system. The network security protection system performs packet discarding processing on the new access traffic from the source address, and transmits, to the router, new access traffic that is not from the source address, so that the router forwards the new access traffic to the next-hop router that reaches the target network address.

In some embodiments, when the access traffic that needs to be verified is the mirrored traffic received from the router, the obtaining a source address of the attack access traffic, and screening attack access traffic to be transmitted to the target network address from the source address in step 105 may be implemented by using the following technical solution: transmitting the source address to the router, so that the router identifies new access traffic from the source address as new attack access traffic, and screens the new attack access traffic, the new access traffic being transmitted by the network service provider to the target network address after the access traffic that needs to be verified, and the new access traffic including a network request transmitted by the subscriber of the network service provider to the target network address.

For example, using the mirrored traffic as the access traffic that needs to be verified is a bypass monitoring mode. A bypass deployment solution is a monitoring mode that has minimum impact on the current network, which neither affects an existing network structure, nor affects a network speed. In the bypass mode, data copied from a mirrored port is analyzed, which does not delay an original data packet. Original traffic corresponding to the mirrored traffic can be normally screened and forwarded, without waiting for a result of identifying the mirrored traffic by the network security protection system.

In some embodiments, because the mirrored traffic is identified herein, traffic reinjection cannot be directly performed on the mirrored traffic, but instead, traffic cleaning is performed based on the source address. A traffic cleaning method may be transmitting the source address to the router, so that the router identifies new access traffic from the source address as new attack access traffic, and screens the new attack access traffic. Alternatively, the source address may be not transmitted to the router, but instead, the new access traffic is also diverted from the router to the network security protection system. The network security protection system performs packet discarding processing on the new access traffic from the source address, and transmits, to the router, new access traffic that is not from the source address, so that the router forwards the new access traffic to the next-hop router that reaches the target network address.

In some embodiments, a query transaction is transmitted to a blockchain network, the query transaction indicating a smart contract for querying a ledge in the blockchain network and a query parameter, so that a consensus node in the blockchain network performs the corresponding smart contract to query for target network addresses and source addresses of attack access traffic that are reported by a plurality of network security protection systems and recorded in the ledge, to obtain a target network address and a source address of attack access traffic that are reported by a network security protection system and satisfy the query parameter in the ledge. An update transaction may be further transmitted to the blockchain network, the update transaction indicating a smart contract for updating the ledge and a new target network address and a source address of attack access traffic that are identified by the network security protection system, so that the consensus node in the blockchain network performs the smart contract for updating the ledge, to update the new target network address and the source address of the attack access traffic that are identified by the network security protection system to the ledge, for query and use by a security protection system or a router.

Figure 3C:
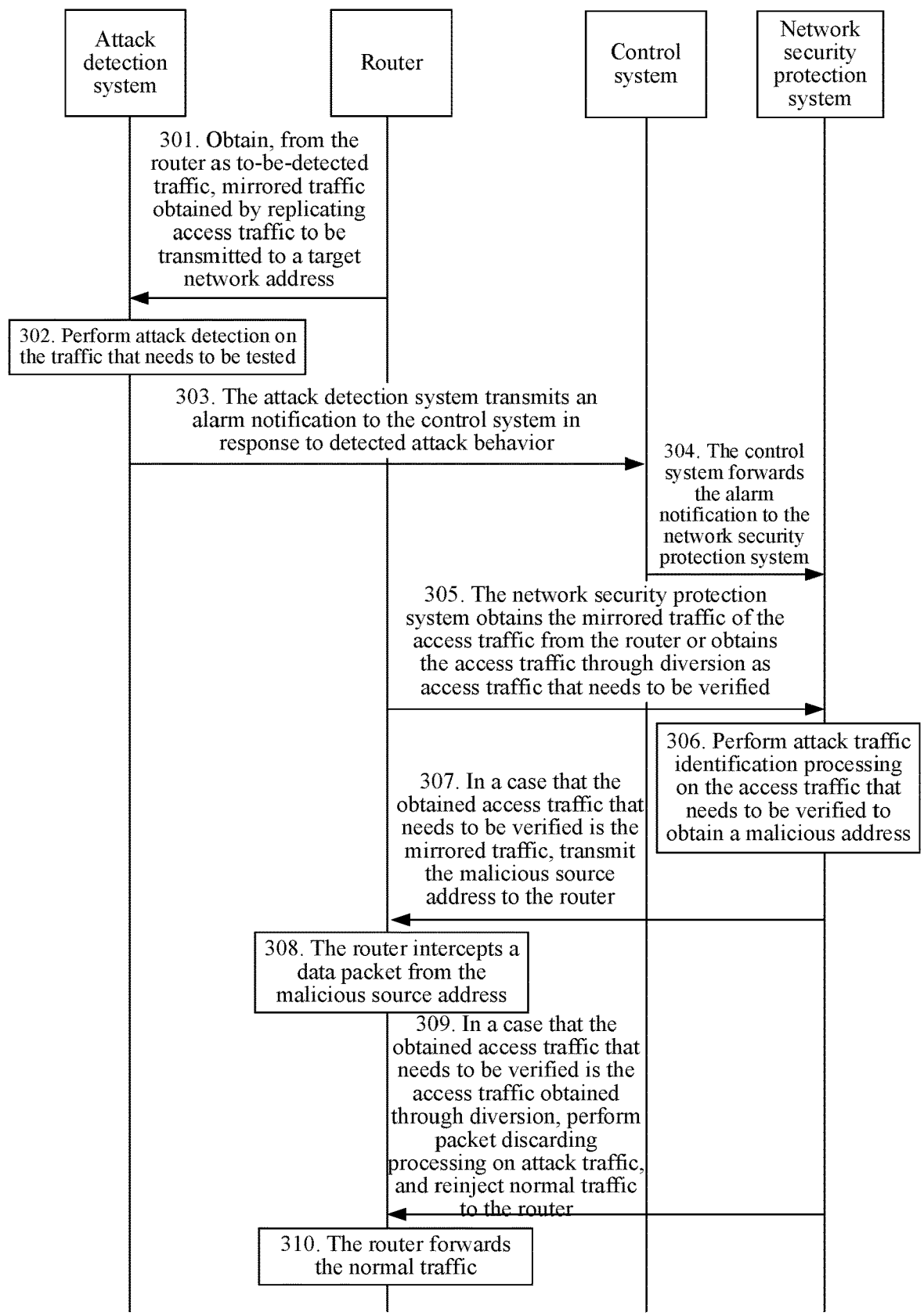

In some embodiments, FIG. 3C is an interaction flowchart of an AI-based network security protection method according to an embodiment of this application. Step 301 to 303 are performed by an attack detection system deployed in a security server. Step 301: The attack detection system deployed in the security server obtains, from a router as access traffic that needs to be tested, mirrored traffic obtained by replicating access traffic to be transmitted to a target network address. Step 302: Perform attack detection on the access traffic that needs to be tested. Step 303: The attack detection system transmits an alarm notification to a control system in response to detected attack behavior. The control system performs step 304. Step 304: Forward the alarm notification to a network security protection system. The network security protection system performs steps 305 to 307 and step 309. Step 305: The network security protection system obtains the mirrored traffic of the access traffic from the router as access traffic that needs to be verified, or obtains the access traffic through diversion as access traffic that needs to be verified. Step 306: Perform attack traffic identification processing on the access traffic that needs to be verified, to obtain a malicious address. The network security protection system performs data extraction on the access traffic that needs to be verified, and communicates with a neural network model by using a network security protection process in the network security protection system. The neural network model extracts a hidden layer feature from a data statistical feature of each session, to classify each session as normal or abnormal based on the hidden layer feature, and identify a session classified as abnormal in the access traffic that needs to be verified as attack access traffic, to obtain a source address of the attack access traffic as a malicious address. The network security protection system diverts the access traffic from the router, then screens attack traffic from the malicious address, and forwards normal traffic. Step 307: When the access traffic that needs to be verified for identification is the mirrored traffic, transmit the malicious source address to the router. The router performs step 308. Step 308: The router intercepts traffic from the malicious source address. Step 309: When the obtained access traffic that needs to be verified is the access traffic obtained through diversion, perform packet discarding processing on attack traffic, and reinject normal traffic to the router. The router performs step 310. Step 310: The router forwards the normal traffic.

The following describes an exemplary application of a network security protection scenario of the embodiments of this application in an application layer.

In some embodiments, normal access traffic of a social network is access traffic formed by visits of common users, and attack traffic is from a hacker who builds a server to simulate access of common users to cause a service server of the social network to respond slower or crash, to achieve malicious purposes. For example, in response to a refresh operation that is performed by a user to refresh a social network information flow and that is received by a terminal of the user, the terminal adds an information refresh request for the service server to access traffic, to transmit the information refresh request to a network service provider. The network service provider transmits the access traffic to a core router, and the core router forwards the access traffic to a network address (that is, a target network address) of the service server. To prevent attack traffic in the access traffic from attacking the service server, a security server is required to identify and clean the access traffic. A session classified as abnormal in access traffic that needs to be verified is identified as attack access traffic, to obtain a source address of the attack access traffic as a malicious address, traffic from the malicious address is screened, and normal traffic that is not from the malicious address is reinjected into the core router. The core router forwards the normal traffic to the target network address (the network address of the service server). The service server adds an information refresh result to return traffic, and returns the return traffic to the terminal by using the network service provider, to present the information refresh result on the terminal. By identifying and screening the attack traffic, normal running of the service server of the social network is ensured.

The following describes a process of identifying attack access traffic.

In the AI-based network security protection method provided in the embodiments of this application, a convolutional neural network model is continuously iteratively trained by using bypass data including normal traffic data and abnormal traffic data, so that the model has a capability of automatically determining normal traffic and abnormal traffic. After the model is trained and mature, the model is deployed in a network security protection system of an existing network for protection. Therefore, the AI-based network security protection method provided in the embodiments of this application mainly includes two aspects: training of the convolutional neural network model, and deployment of the network security protection system.

Figure 4:
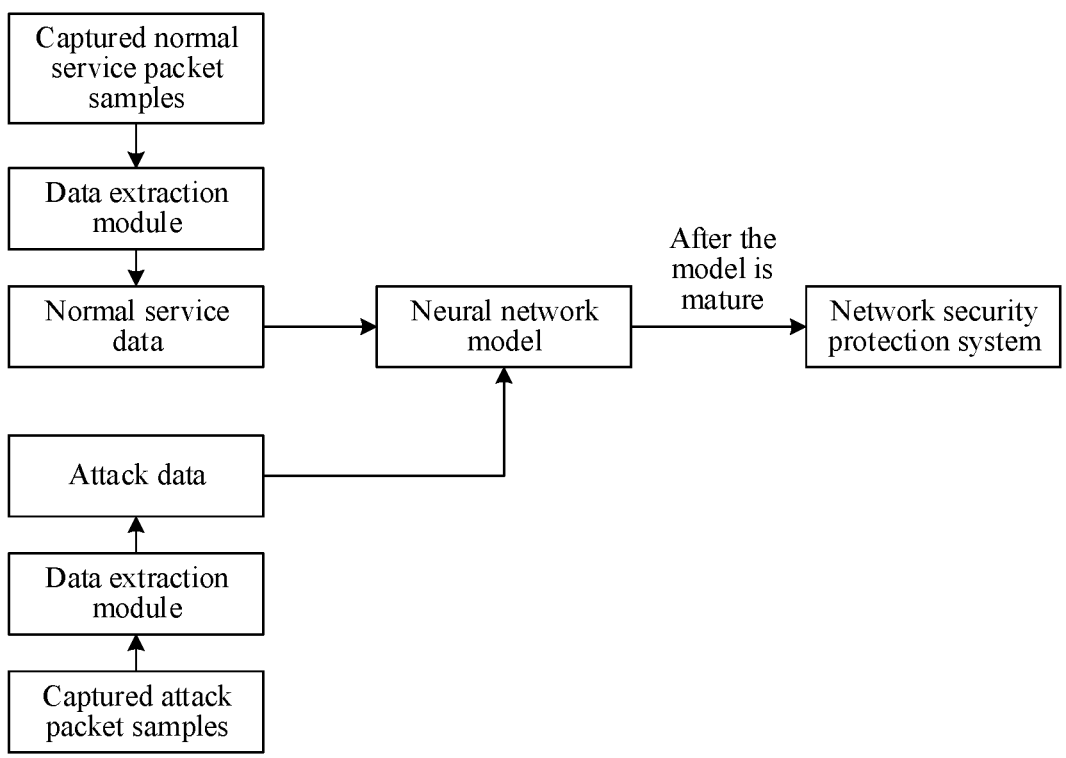
FIG. 4 is an architectural diagram of neural network model training in an AI-based network security protection method according to an embodiment of this application.

FIG. 4 is an architectural diagram of neural network model training in an AI-based network security protection method according to an embodiment of this application. A procedure of training a neural network model is as follows: First, normal service packets and attack packets are collected through bypass packet capture. The bypass packet capture is a method of observing network traffic through a bypass, so that flowing of network traffic on a main path is not affected. Next, a data extraction module performs extraction and integration on the captured packets to obtain normal session data samples and abnormal session data samples. The normal session data samples and the abnormal session data samples are added with different labels for neural network model training. Next, after continuously trained by using massive normal session data samples and abnormal session data samples, the neural network model tends to mature and has a capability of automatically identifying normal service traffic and attack traffic. After the model is mature, the model is deployed in a network security protection system to defense against actual attacks.

Next, an implementation principle of the data extraction module and a method of building the neural network model are described in detail. The data extraction module extracts data from captured packet files and assigns labels to various data, a label of normal service data being 0, and a label of attack data being 1, which are used as training data for training the neural network model. Specific steps are as follows: The following basic data features of each packet are extracted from the captured packet files: an SSL protocol version, a handshake version, an SSL packet length, a cipher suite length, a cipher suite, a group length, group content, an extension length, and a supported extension quantity. The basic data features of each packet are analyzed to extract modes of aggregates of each basic data feature in attack packets and normal packets, to further extract features shown in the following Table 1. Table 1 is a data feature extraction table of an AI-based network security protection method according to an embodiment of this application. The data may be used as input data of a convolutional neural network. The first column is basic features of a protocol, which may be directly extracted from captured packet files of protocol traffic. The second column and the third column are secondary features obtained by further performing statistical analysis on the basic features in the first column. Aggregate values, that is, modes, of each basic feature in normal and abnormal samples are respectively analyzed, and absolute distances between each sample and the modes are calculated.

TABLE 1

Data feature extraction table

| | | |
|---|---|---|
| SSL protocol version | | |
| Handshake version | | |
| SSL packet length | Absolute distance between SSL packet length and normal sample mode | Absolute distance between SSL packet length and abnormal sample mode |

TABLE 1-continued

Data feature extraction table

| | | |
|---|---|---|
| Cipher suite length | Absolute distance between cipher suite length and normal sample mode | Absolute distance between cipher suite length and abnormal sample mode |
| Cipher suite Group length | Absolute distance between group length and normal sample mode | Absolute distance between group length and abnormal sample mode |
| Group content Extension length | Absolute distance between extension length and normal sample mode | Absolute distance between extension length and abnormal sample mode |
| Supported extension quantity | Absolute distance between supported extension quantity and normal sample mode | Absolute distance between supported extension quantity and abnormal sample mode |

Figure 6:
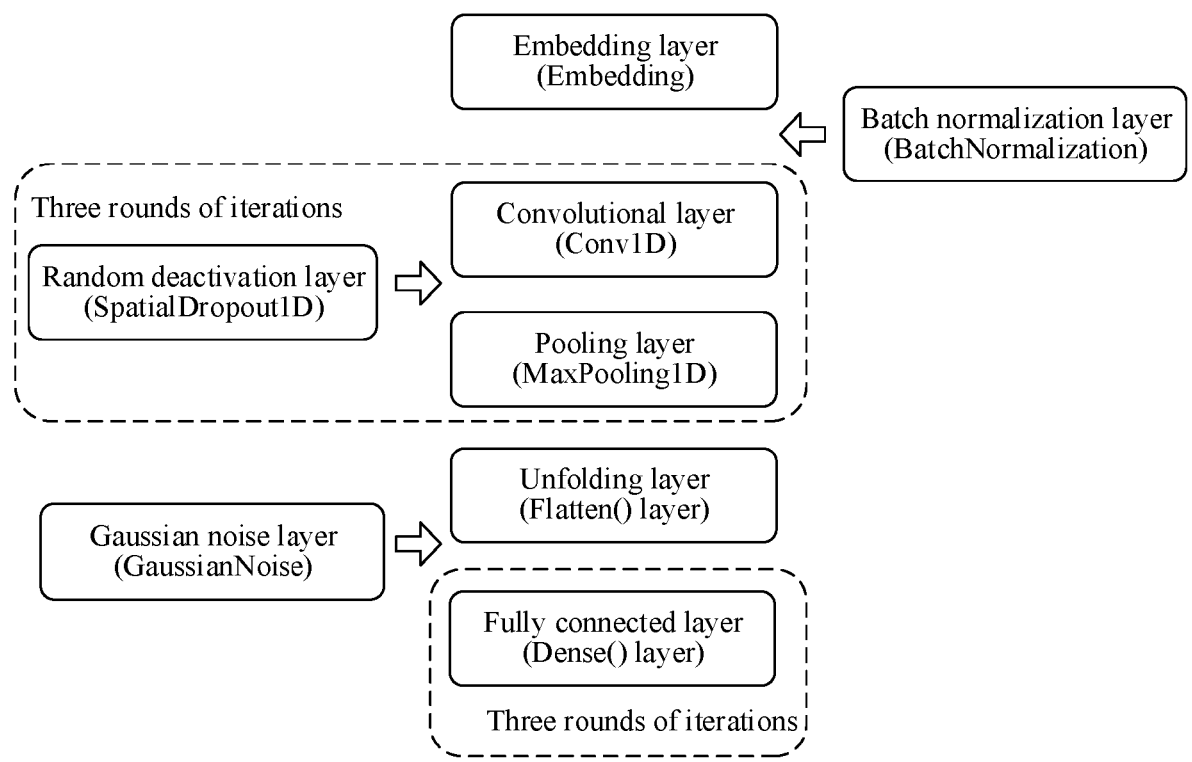
FIG. 6 is an architectural diagram of a neural network model in an AI-based network security protection method according to an embodiment of this application.

FIG. 5 is a schematic diagram of packet capture in an AI-based network security protection method according to an embodiment of this application. A captured data packet includes an SSL protocol version 501, a handshake version 502, an SSL packet length, a cipher suite length 506, a cipher suite 503, a group length and content 505, extension content 507, an extension length 504, and a supported extension quantity. For example, the packet length is 326, the SSL protocol version is TLS 1.0, the handshake version is TLS 2.0, the cipher suite length is 148, the extension length is 133, and the group length is 52. FIG. 6 is an architectural diagram of a neural network model in an AI-based network security protection method according to an embodiment of this application. The neural network model includes an embedding layer (Embedding), a common layer, a convolutional layer (Conv1D), a pooling layer (Maxpooling1D), and a fully connected layer (Dense( ) layer). As the first layer of the neural network model, the embedding layer is configured to fix an input dimension. The convolutional layer is configured to extract features. The pooling layer is configured to sample features. The fully connected layer is configured to map a learned distributed feature representation to a sample label space as a classifier. A batch normalization layer (BatchNormalization) in the common layer performs equalization processing, that is, re-normalizes an activation value of a previous layer for each batch of training sample sets, so that its output data has an average value close to 0 and a standard deviation close to 1. A random deactivation layer (Spatial Dropout 1D) in the common layer has a function similar to that of a common dropout operation, but it disconnects an entire 1D feature map instead of a single neuron. If there is a strong correlation between adjacent elements of a feature map (which usually occurs in a low-level convolutional layer), a common dropout operation cannot regularize its output, otherwise, a significant drop is caused in a learning rate. In this case, Spatial Dropout 1D can help improve independence between feature maps. There are three rounds of iterations of the convolutional layer, the random deactivation layer, and the pooling layer. A Gaussian noise layer (GaussianNoise) in the common layer applies, to data, additive Gaussian noise with an average value of 0 and a standard deviation of stddev. This layer is relatively useful in overcoming over-fitting. Gaussian noise is a natural choice when input data needs to be destroyed. Flattening processing of an unfolding layer (Flatten( ) layer) in the common layer is to flatten an input, that is, to make a multi-dimensional input be 1D, which is often used in transition from the convolutional layer to the fully connected layer. There are also three rounds of iterations of the fully connected layer (Dense( ) layer). After the convolutional neural network model is built, the model is trained by using massive normal service data and attack data. After the model converges, the model has a capability of automatically identifying normal service data and attack data. For a loss function used in an iterative training process, refer to formula (2):

$$H(y,t)=H_t(y)=-\Sigma_i t_i \log y_i \qquad (2)$$

Figure 7:
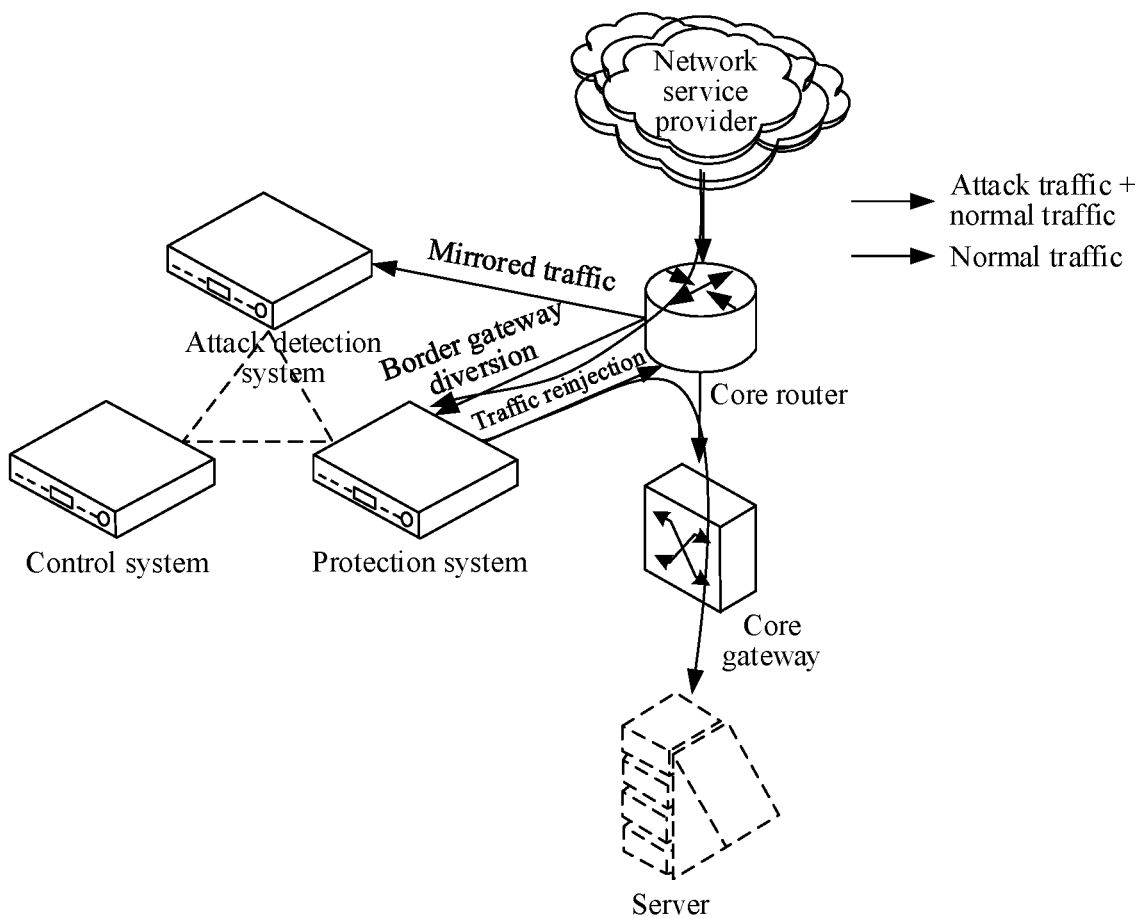
FIG. 7 is an architectural diagram of protection system deployment of an AI-based network security protection method according to an embodiment of this application.

FIG. 7 is an architectural diagram of protection system deployment of an AI-based network security protection method according to an embodiment of this application. A DDoS prevention procedure includes: an attack detection system, a control system, and a network security protection system. A detection and protection procedure is as follows: In response to received access traffic from a network service provider, a core router forwards mirrored traffic to the attack detection system through optical splitting, to perform attack detection. After an attack is detected, the attack detection system generates an alarm and transmits the alarm to the control system. The network security protection system receives the alarm from the control system, and publishes a diverted route to an attacked IP address to the core router by using a border gateway protocol connection established to the core router, to implement border gateway diversion. The network security protection system identifies mirrored traffic (including normal traffic and attack traffic) obtained through bypass packet capture, and obtains a source address of the attack traffic as a malicious address (for example, an IP address). The network security protection system cleans, according to an identification result, the attack traffic in the access traffic diverted to the network security protection system, and reinjects the normal traffic to the core router. Then the normal traffic is forwarded to a core gateway, and further forwarded to a service server of a target network address. Herein, after trained, a neural network model is deployed in the network security protection system.

Figure 8:
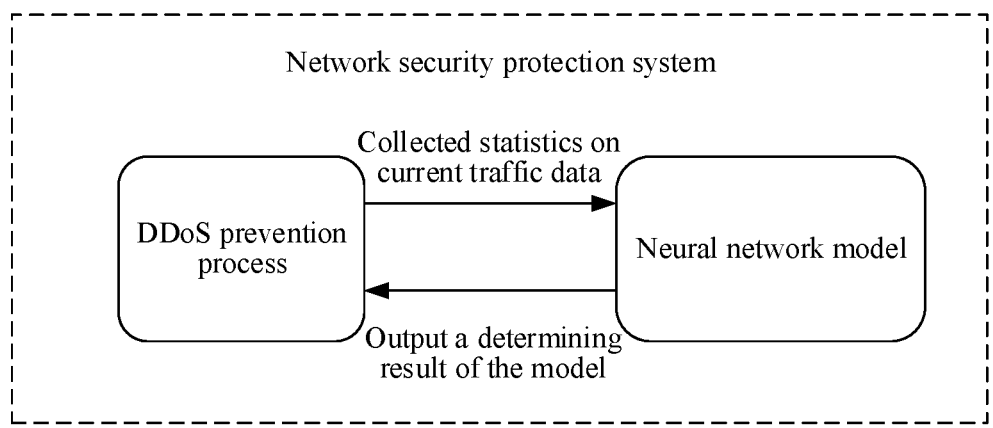
FIG. 8 is a schematic diagram of process communication in an AI-based network security protection method according to an embodiment of this application.

The following further describes a process of cleaning attack traffic. After a protected IP address is attacked, all traffic (including normal traffic and attack traffic) flowing to this IP address is diverted to the network security protection system. The network security protection system identifies and cleans the attack traffic, and finally reinjects the normal traffic to a server. A method of cleaning attack traffic is as follows: FIG. 8 is a schematic diagram of process communication in an AI-based network security protection method according to an embodiment of this application. A DDoS prevention process (a network security protection process) and a neural network model are deployed in the network security protection system. The DDoS prevention process communicates with the neural network model by using a socket. In a protection process, the DDoS prevention process collects all feature data in current traffic (a data statistical collection manner is the same as the implementation of the data extraction module), and transmits the feature data to the neural network model. The neural network model determines data that needs to be tested, adds a result label to each piece of session data, and outputs results to the DDoS prevention process. A session includes a plurality of data packets. The session is a set of data packets with the same source IP, destination IP, source port, destination port, and protocol. The DDoS prevention process performs cleaning based on these results. The DDoS prevention process blacklists a source IP of a packet identified as abnormal, that is, all packets from this source IP are discarded. A packet from a normal source IP is identified as normal by the neural network model, and no normal source IP is blacklisted. Therefore, traffic from the IP is forwarded to the server by the DDoS prevention process. After the foregoing steps, attack traffic can be identified and cleaned, and normal traffic can be forwarded to the server. Actually, the DDoS prevention process runs in the server, and the process exchanges data with the neural network model (that is, a running instance of the model) in the server, so that the neural network model completes traffic identification. Compared with a "model and process" coupling solution in the related art, a decoupling improvement is performed. The DDoS prevention process is decoupled from the neural network model, so that the neural network model can flexibly get offline, suspended, or updated without disabling the entire protection function, thereby avoiding a protection delay caused by getting online again.

The AI-based network security protection method provided in the embodiments of this application is a non-decryption HTTPS CC attack identification and defense solution based on a convolutional neural network, which can be used as an effective supplement to a DDoS prevention algorithm system of an existing network. A neural network model is trained by using massive bypass data, and after the model is trained and mature, the model has a capability of automatically determining normal traffic and attack traffic, which implements efficient and accurate cleaning of HTTPS CC, ensures service stability of an attacked server, and ensures that a normal service is not affected. In addition, this solution does not require any modification of a server/client for access, which has good compatibility. Moreover, compared with a big data solution in the related art, a machine learning algorithm is modeled by using an appropriate algorithm, and classification can be implemented without rules, which shows a strong generalization capability, and automatic learning and training are performed based on a large amount of data, which does not rely on references, and can also protect a new online service. Therefore, the neural network model is of great significance to improvement of a protection capability of the existing network. In addition to the network security protection method provided in the embodiments of the present application, other machine learning algorithms may also be used to build the neural network model.

The following further describes an exemplary structure of the AI-based network security protection apparatus 255 provided in the embodiments of this application, which is implemented as software modules. In some embodiments, as shown in FIG. 2, the software modules in the AI-based network security protection apparatus 255 stored in the memory 250 may include: a traffic obtaining module 2551, configured to obtain access traffic that needs to be verified to be transmitted to a target network address; a data extraction module 2552, configured to extract a data statistical feature of each of a plurality of sessions included in the access traffic that needs to be verified; a traffic classification module 2553, configured to invoke a neural network model based on the data statistical feature of each session, to classify each session as normal or abnormal; a traffic identification module 2554, configured to identify a session classified as abnormal in the access traffic that needs to be verified as attack access traffic; and a traffic cleaning module 2555, configured to obtain a source address of the attack access traffic, and screen attack access traffic to be transmitted to the target network address from the source address.

In some embodiments, the traffic obtaining module 2551 is further configured to: transmit a mirrored traffic request to a router, the mirrored traffic request carrying the target network address, so that during routing of access traffic to be transmitted to the target network address, the router replicates the access traffic to obtain mirrored traffic of the access traffic, the access traffic including a network request transmitted by a subscriber of a network service provider to the target network address; and receive the mirrored traffic transmitted by the router as the access traffic that needs to be verified.

In some embodiments, the traffic obtaining module 2551 is further configured to: transmit a route diversion rule to a router, the route diversion rule carrying the target network address and a diverted target network address, so that the router guides access traffic to be transmitted to the target network address to the diverted target network address, the access traffic including a network request transmitted by a subscriber of a network service provider to the target network address; and receive the access traffic guided by the router to the diverted target network address as the access traffic that needs to be verified.

In some embodiments, the traffic classification module 2553 is further configured to: transmit the data statistical feature of each session to the neural network model by using a socket connection between a network security protection process and the neural network model; and receive, by using the socket connection between the network security protection process and the neural network model, a classification result returned by the neural network model.

In some embodiments, before obtaining the access traffic that needs to be verified to be transmitted to the target network address, the traffic obtaining module 2551 is further configured to: obtain, from a router, access traffic that needs to be tested to be transmitted to the target network address, the access traffic that needs to be tested being mirrored traffic obtained by replicating access traffic to be transmitted to the target network address; and perform attack behavior pattern matching on the access traffic that needs to be tested, and determine, in response to matched attack behavior, that the access traffic that needs to be verified to be transmitted to the target network address needs to be obtained.

In some embodiments, the data extraction module 2552 is further configured to: extract a plurality of data packets included in each of the plurality of sessions included in the access traffic that needs to be verified; extract, from the plurality of data packets included in each session, a data feature in at least one of the following dimensions: a protocol version of an SSL applied in a process of transmitting the data packet; a handshake version applied in the process of transmitting the data packet; a packet length of the SSL applied in the process of transmitting the data packet; a cipher suite length of the data packet; a cipher suite of the data packet; a group length of the data packet; group content of the data packet; an extension length of the data packet; and a supported extension quantity of the data packet; and extract a corresponding data statistical feature from the data feature in the at least one dimension of each session.

In some embodiments, the data extraction module 2552 is further configured to: obtain a normal mode of a data feature in each dimension in normal session samples and an abnormal mode of the data feature in each dimension in abnormal session samples; determine a distance between the data feature in the at least one dimension of each session and a normal mode in the corresponding dimension as a normal absolute distance in the corresponding dimension; determine a distance between the data feature in the at least one dimension of each session and an abnormal mode in the corresponding dimension as an abnormal absolute distance in the corresponding dimension; and combine the normal absolute distance and the abnormal absolute distance in the at least one dimension that are determined for each session as the data statistical feature of the corresponding session.

In some embodiments, the neural network model includes an embedding layer, a hidden layer, and a fully connected layer that are cascaded; and the traffic classification module 2553 is further configured to: perform the following processing for each session: receiving the data statistical feature of the session by using the embedding layer, and transmitting the data statistical feature of the session to the hidden layer; extracting a hidden layer feature from the received data statistical feature by using the hidden layer, and transmitting the hidden layer feature to the fully connected layer; and mapping the received hidden layer feature to a normal category probability and an abnormal category probability by using the fully connected layer, a category corresponding to a larger value of the normal category probability and the abnormal category probability being a classification result of the session.

In some embodiments, the hidden layer includes: a batch normalization layer, a convolutional layer, and a pooling layer; and the traffic classification module 2553 is further configured to: normalize an activation value of the received data statistical feature by using the batch normalization layer, to obtain a data statistical feature satisfying normal distribution; perform, by using the convolutional layer, feature extraction processing on the data statistical feature outputted by the batch normalization layer, to obtain a convolutional layer feature corresponding to the data statistical feature; and sample, by using the pooling layer, the convolutional layer feature outputted by the convolutional layer, to obtain the hidden layer feature corresponding to the data statistical feature.

In some embodiments, when the access traffic that needs to be verified is obtained from the router through guiding by using the route diversion rule, the traffic cleaning module 2555 is further configured to: filter out the attack access traffic in the access traffic that needs to be verified, and transmit filtered normal access traffic to the router for forwarding by the router; and transmit the source address to the router, so that the router identifies new access traffic from the source address as new attack access traffic, and screens the new attack access traffic, the new access traffic being transmitted by the network service provider to the target network address after the access traffic that needs to be verified, and the new access traffic including a network request transmitted by the subscriber of the network service provider to the target network address.

In some embodiments, when the access traffic that needs to be verified is the mirrored traffic received from the router, the traffic cleaning module 2555 is further configured to: transmit the source address to the router, so that the router identifies new access traffic from the source address as new attack access traffic, and screens the new attack access traffic, the new access traffic being transmitted by the network service provider to the target network address after the access traffic that needs to be verified, and the new access traffic including a network request transmitted by the subscriber of the network service provider to the target network address.

In some embodiments, the apparatus 255 further includes: a training module 2556, configured to: before the neural network model is invoked based on the data statistical feature of each session, to classify each session as normal or abnormal, obtain session samples in a manner of packet capture from a router bypass, and combine a pre-labeled normal session sample and abnormal session sample into a training sample set; initialize the neural network model, and initialize a loss function including a session sample and a classification result corresponding to the session sample; and perform the following processing in each iterative training process of the neural network model: classify, by using the neural network model, session samples included in the training sample set, to obtain classification results corresponding to the session samples; substitute true categories corresponding to the session samples and the classification results into the loss function, to determine a neural network model parameter corresponding to a minimum value of the loss function; and update the neural network model according to the determined neural network model parameter.

The embodiments of this application provide a storage medium storing executable instructions, the executable instructions, when executed by a processor, causing the processor to perform the AI-based network security protection method provided in the embodiments of this application, for example, the AI-based network security protection method shown in FIG. 3A to FIG. 3C.

In some embodiments, the storage medium may be a memory such as a ferroelectric RAM (FRAM), a ROM, a programmable ROM (PROM), an electrically programmable ROM (EPROM), an electrically erasable PROM (EEPROM), a flash memory, a magnetic surface memory, an optical disk, or a CD-ROM, or may be any device including one of or any combination of the foregoing memories.

In some embodiments, the executable instructions can be written in a form of a program, software, a software module, a script, or code and according to a programming language (including a compiler or interpreter language or a declarative or procedural language) in any form, and may be deployed in any form, including an independent program or a module, a component, a subroutine, or another unit suitable for use in a computing environment.

In an example, the executable instructions may, but do not necessarily, correspond to a file in a file system, and may be stored in a part of a file that saves another program or other data, for example, be stored in one or more scripts in a hypertext markup language (HTML) file, stored in a file that is specially used for a program in discussion, or stored in the plurality of collaborative files (for example, be stored in files of one or modules, subprograms, or code parts).

In an example, the executable instructions can be deployed for execution on one computing device, execution on a plurality of computing devices located at one location, or execution on a plurality of computing devices that are distributed at a plurality of locations and that are interconnected through a communication network.

In conclusion, in the embodiments of this application, attack access traffic is identified by using mode features at a data statistical level, without relying on features at an information level that reflect content. Therefore, the identification is not affected regardless of whether a traffic packet is encrypted, so that encrypted and unencrypted attack access traffic can be identified. A source address of the attack access traffic is obtained based on an identification result, to screen attack access traffic to be transmitted to a target network address, so that the encrypted and unencrypted attack access traffic can be cleaned.

The foregoing descriptions are merely embodiments of this application and are not intended to limit the protection scope of this application. Any modification, equivalent replacement, or improvement made without departing from the spirit and range of this application shall fall within the protection scope of this application.

What is claimed is:

1. An artificial intelligence (AI)-based network security protection method, performed by an electronic device, the method comprising:
    obtaining access traffic that needs to be verified and to be transmitted to a target network address;
    extracting a data statistical feature of each of a plurality of sessions included in the access traffic that needs to be verified;
    invoking a neural network model that comprises an embedding layer, a hidden layer, and a fully connected layer that are cascaded, to classify each session as normal or abnormal, comprising: for each session,
        receiving the data statistical feature of the session by using the embedding layer, and transmitting the data statistical feature of the session to the hidden layer;
        extracting a hidden layer feature from the data statistical feature by using the hidden layer, and transmitting the hidden layer feature to the fully connected layer; and
        mapping the hidden layer feature to a normal category probability and an abnormal category probability by using the fully connected layer, a category corresponding to a larger value of the normal category probability and the abnormal category probability being a classification result of the session;
    identifying a session classified as abnormal in the access traffic that needs to be verified as attack access traffic; and
    obtaining a source address of the attack access traffic, and screening the attack access traffic to be transmitted to the target network address from the source address.

2. The method according to claim 1, wherein the obtaining the access traffic that needs to be verified to be transmitted to the target network address comprises:
    transmitting a mirrored traffic request to a router, the mirrored traffic request carrying the target network address, so that the router performs the following operation: during routing of access traffic to be transmitted to the target network address, replicating the access traffic to obtain mirrored traffic of the access traffic, the access traffic comprising a network request transmitted by a subscriber of a network service provider to the target network address; and
    receiving the mirrored traffic transmitted by the router as the access traffic that needs to be verified.

3. The method according to claim 1, wherein the obtaining the access traffic that needs to be verified to be transmitted to the target network address comprises:
    transmitting a route diversion rule to a router, the route diversion rule carrying the target network address and a diverted target network address, the router performing the following operation: guiding access traffic to be transmitted to the target network address to the diverted target network address, the access traffic comprising a network request transmitted by a subscriber of a network service provider to the target network address; and
    receiving the access traffic guided by the router to the diverted target network address as the access traffic that needs to be verified.

4. The method according to claim 1, wherein after the extracting the data statistical feature of each session, the method further comprises:
    transmitting the data statistical feature of each session to the neural network model by using a socket connection between a network security protection process and the neural network model; and
    before the identifying the session classified as abnormal in the access traffic that needs to be verified as the attack access traffic, the method further comprises:
    receiving, by using the socket connection between the network security protection process and the neural network model, a classification result returned by the neural network model.

5. The method according to claim 1, wherein before the obtaining the access traffic that needs to be verified to be transmitted to the target network address, the method further comprises:
    obtaining, from a router, access traffic that needs to be tested to be transmitted to the target network address, the access traffic that needs to be tested being mirrored traffic obtained by replicating access traffic to be transmitted to the target network address; and
    performing attack behavior pattern matching on the access traffic that needs to be tested, and determining, in response to matched attack behavior, that the access traffic that needs to be verified to be transmitted to the target network address needs to be obtained.

6. The method according to claim 1, wherein the extracting the data statistical feature of each of the plurality of sessions comprised in the access traffic that needs to be verified comprises:
    extracting a plurality of data packets comprised in each of the plurality of sessions comprised in the access traffic that needs to be verified;
    extracting, from the plurality of data packets comprised in each session, a data feature in at least one of the following dimensions:
        a protocol version of a secure socket layer (SSL) applied in a process of transmitting the data packet; a handshake version applied in the process of transmitting the data packet; a packet length of the SSL applied in the process of transmitting the data packet; a cipher suite length of the data packet; a cipher suite of the data packet; a group length of the data packet; group content of the data packet; an extension length of the data packet; and a supported extension quantity of the data packet; and
    extracting a corresponding data statistical feature from the data feature in the at least one dimension of each session.

7. The method according to claim 6, wherein the extracting the corresponding data statistical feature from the data feature in the at least one dimension of each session comprises:
    obtaining a normal mode of a data feature in each dimension in normal session samples and an abnormal mode of the data feature in each dimension in abnormal session samples;
    determining a distance between the data feature in the at least one dimension of each session and a normal mode in the corresponding dimension as a normal absolute distance in the corresponding dimension;
    determining a distance between the data feature in the at least one dimension of each session and an abnormal mode in the corresponding dimension as an abnormal absolute distance in the corresponding dimension; and
    combining the normal absolute distance and the abnormal absolute distance in the at least one dimension that are determined for each session as the data statistical feature of the corresponding session.

8. The method according to claim 1, wherein
the hidden layer comprises: a batch normalization layer, a convolutional layer, and a pooling layer; and
the extracting the hidden layer feature from the data statistical feature by using the hidden layer comprises:
normalizing an activation value of the received data statistical feature by using the batch normalization layer, to obtain a data statistical feature satisfying normal distribution;
performing, by using the convolutional layer, feature extraction processing on the data statistical feature outputted by the batch normalization layer, to obtain a convolutional layer feature corresponding to the data statistical feature; and
sampling, by using the pooling layer, the convolutional layer feature outputted by the convolutional layer, to obtain the hidden layer feature corresponding to the data statistical feature.

9. The method according to claim 1, wherein when the access traffic that needs to be verified is obtained from the router through guiding by using the route diversion rule, the obtaining the source address of the attack access traffic, and screening the attack access traffic to be transmitted to the target network address from the source address comprises:
filtering out the attack access traffic in the access traffic that needs to be verified, and transmitting filtered normal access traffic to the router for forwarding by the router; and
transmitting the source address to the router, the router identifying new access traffic from the source address as new attack access traffic, and screens the new attack access traffic,
the new access traffic being transmitted by the network service provider to the target network address after the access traffic that needs to be verified, and the new access traffic comprising a network request transmitted by a subscriber of a network service provider to the target network address.

10. The method according claim 1, wherein when the access traffic that needs to be verified is the mirrored traffic received from the router, the obtaining the source address of the attack access traffic, and screening the attack access traffic to be transmitted to the target network address from the source address comprises:
transmitting the source address to the router, the router identifying new access traffic from the source address as new attack access traffic, and screens the new attack access traffic,
the new access traffic being transmitted by a network service provider to the target network address after the access traffic that needs to be verified, and the new access traffic comprising a network request transmitted by a subscriber of the network service provider to the target network address.

11. The method according to claim 1, wherein before the hidden layer feature is extracted from the data statistical feature of each session by using the neural network model, to classify each session as normal or abnormal based on the hidden layer feature, the method further comprises:
obtaining session samples by packet capture from a router bypass, and combining a pre-labeled normal session sample and abnormal session sample into a training sample set;
initializing the neural network model, and initializing a loss function comprising a session sample and a classification result corresponding to the session sample; and performing the following processing in each iterative training process of the neural network model:
classifying, by using the neural network model, session samples comprised in the training sample set, to obtain classification results corresponding to the session samples;
substituting true categories corresponding to the session samples and the classification results into the loss function, to determine a neural network model parameter corresponding to a minimum value of the loss function; and
updating the neural network model according to the determined neural network model parameter.

12. An artificial intelligence (AI)-based network security protection apparatus, comprising a memory and a processor coupled to the memory, the processor being configured to:
obtain access traffic that needs to be verified to be transmitted to a target network address;
extract a data statistical feature of each of a plurality of sessions comprised in the access traffic that needs to be verified;
invoke a neural network model that comprises an embedding layer, a hidden layer, and a fully connected layer that are cascaded, to classify each session as normal or abnormal, comprising: for each session,
receiving the data statistical feature of the session by using the embedding layer, and transmitting the data statistical feature of the session to the hidden layer;
extracting a hidden layer feature from the data statistical feature by using the hidden layer, and transmitting the hidden layer feature to the fully connected layer; and
mapping the hidden layer feature to a normal category probability and an abnormal category probability by using the fully connected layer, a category corresponding to a larger value of the normal category probability and the abnormal category probability being a classification result of the session;
identify a session classified as abnormal in the access traffic that needs to be verified as attack access traffic; and
obtain a source address of the attack access traffic, and screen the attack access traffic to be transmitted to the target network address from the source address.

13. A non-transitory computer-readable storage medium, storing executable instructions, when executed by a processor, causing the processor to implement the artificial intelligence (AI)-based network security protection method, the method comprising:
obtaining access traffic that needs to be verified and to be transmitted to a target network address;
extracting a data statistical feature of each of a plurality of sessions included in the access traffic that needs to be verified;
invoking a neural network model that comprises an embedding layer, a hidden layer, and a fully connected layer that are cascaded, to classify each session as normal or abnormal, comprising: for each session,
receiving the data statistical feature of the session by using the embedding layer, and transmitting the data statistical feature of the session to the hidden layer;
extracting a hidden layer feature from the data statistical feature by using the hidden layer, and transmitting the hidden layer feature to the fully connected layer; and
mapping the hidden layer feature to a normal category probability and an abnormal category probability by using the fully connected layer, a category corresponding to a larger value of the normal category probability and the abnormal category probability being a classification result of the session;
identifying a session classified as abnormal in the access traffic that needs to be verified as attack access traffic; and
obtaining a source address of the attack access traffic, and screening the attack access traffic to be transmitted to the target network address from the source address.

14. The computer-readable storage medium according to claim 13, wherein the obtaining the access traffic that needs to be verified to be transmitted to the target network address comprises:
transmitting a mirrored traffic request to a router, the mirrored traffic request carrying the target network address, the router performing the following operation: during routing of access traffic to be transmitted to the target network address, replicating the access traffic to obtain mirrored traffic of the access traffic, the access traffic comprising a network request transmitted by a subscriber of a network service provider to the target network address; and
receiving the mirrored traffic transmitted by the router as the access traffic that needs to be verified.

15. The computer-readable storage medium according to claim 13, wherein the obtaining the access traffic that needs to be verified to be transmitted to the target network address comprises:
transmitting a route diversion rule to a router, the route diversion rule carrying the target network address and a diverted target network address, the router performing the following operation: guiding access traffic to be transmitted to the target network address to the diverted target network address, the access traffic comprising a network request transmitted by a subscriber of a network service provider to the target network address; and
receiving the access traffic guided by the router to the diverted target network address as the access traffic that needs to be verified.

16. The computer-readable storage medium according to claim 13, wherein after the extracting the data statistical feature of each session, the method further comprises:
transmitting the data statistical feature of each session to the neural network model by using a socket connection between a network security protection process and the neural network model; and
before the identifying a session classified as abnormal in the access traffic that needs to be verified as attack access traffic, the method further comprises:
receiving, by using the socket connection between the network security protection process and the neural network model, a classification result returned by the neural network model.

17. The computer-readable storage medium according to claim 13, wherein before the obtaining the access traffic that needs to be verified to be transmitted to the target network address, the method further comprises:
obtaining, from a router, access traffic that needs to be tested to be transmitted to the target network address, the access traffic that needs to be tested being mirrored traffic obtained by replicating access traffic to be transmitted to the target network address; and
performing attack behavior pattern matching on the access traffic that needs to be tested, and determining, in response to matched attack behavior, that the access traffic that needs to be verified to be transmitted to the target network address needs to be obtained.

18. The computer-readable storage medium according to claim 13, wherein the extracting the data statistical feature of each of the plurality of sessions comprised in the access traffic that needs to be verified comprises:
extracting a plurality of data packets comprised in each of the plurality of sessions comprised in the access traffic that needs to be verified;
extracting, from the plurality of data packets comprised in each session, a data feature in at least one of the following dimensions:
a protocol version of a secure socket layer (SSL) applied in a process of transmitting the data packet; a handshake version applied in the process of transmitting the data packet; a packet length of the SSL applied in the process of transmitting the data packet; a cipher suite length of the data packet; a cipher suite of the data packet; a group length of the data packet; group content of the data packet; an extension length of the data packet; and a supported extension quantity of the data packet; and
extracting a corresponding data statistical feature from the data feature in the at least one dimension of each session.

19. The computer-readable storage medium according to claim 18, wherein the extracting the corresponding data statistical feature from the data feature in the at least one dimension of each session comprises:
obtaining a normal mode of a data feature in each dimension in normal session samples and an abnormal mode of the data feature in each dimension in abnormal session samples;
determining a distance between the data feature in the at least one dimension of each session and a normal mode in the corresponding dimension as a normal absolute distance in the corresponding dimension;
determining a distance between the data feature in the at least one dimension of each session and an abnormal mode in the corresponding dimension as an abnormal absolute distance in the corresponding dimension; and
combining the normal absolute distance and the abnormal absolute distance in the at least one dimension that are determined for each session as the data statistical feature of the corresponding session.

* * * * *